United States Patent
Kubo et al.

(10) Patent No.: US 7,441,079 B2
(45) Date of Patent: Oct. 21, 2008

(54) DATA LOCATION MANAGEMENT IN HIGH DENSITY PACKAGING

(75) Inventors: Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/385,610

(22) Filed: Mar. 21, 2006

(65) Prior Publication Data

US 2007/0226756 A1    Sep. 27, 2007

(51) Int. Cl.
*G06F 12/00* (2006.01)

(52) U.S. Cl. ........................ 711/112; 360/133
(58) Field of Classification Search ................ 711/112, 711/114, 170, 167, 154; 360/133, 131, 135, 360/137
See application file for complete search history.

(56) References Cited

U.S. PATENT DOCUMENTS

| | | | |
|---|---|---|---|
| 5,349,713 A * | 9/1994 | Stimpfl | 360/137 |
| 5,734,524 A * | 3/1998 | Ruiz | 360/234 |
| 5,966,510 A | 10/1999 | Carbonneau | |
| 6,078,979 A | 6/2000 | Li et al. | |
| 6,563,704 B2 | 5/2003 | Grouell et al. | |
| 6,571,310 B1 | 5/2003 | Ottesen et al. | |
| 6,819,560 B2 | 11/2004 | Konshak et al. | |
| 6,906,890 B2 * | 6/2005 | Gavit et al. | 360/93 |
| 7,344,101 B2 * | 3/2008 | Richardson et al. | 360/132 |
| 2003/0221060 A1 | 11/2003 | Umberger | |
| 2005/0117310 A1 | 6/2005 | Miyamoto | |

FOREIGN PATENT DOCUMENTS

WO    WO 02/056305    *    7/2002

OTHER PUBLICATIONS

American Institute of Physics, J. A. C. Humphrey et al., Analysis of Viscous Dissipation in Disk Storage Systems and Similar Flow Configurations, Phys. Fluids A, vol. 4, No. 7, Jul. 1992, pp. 1415-1427.*
"Airflow System for Disk Drive", IBM Technical Disclosure Bulletin, vol. 29, Issue 3, pp. 1258-1261, Aug. 1986.*
Sun et al. (2004) Lecture Notes in Computer Science, Workshop 2, 3252:254.
Zabback et al. (1998) IEEE Transactions on Knowledge and Data Engineering, 10:855.

* cited by examiner

*Primary Examiner*—Pierre-Michel Bataille
(74) *Attorney, Agent, or Firm*—Dan Shifrin

(57) ABSTRACT

A high density storage enclosure includes a plurality of storage devices, such as hard disk drives, positioned within a cooling airflow. Data to be stored to a storage device is received and a determination is made as to the expected usage of the data relative to other data stored on devices within the enclosure. The data is stored in a device having a position within the airflow relative to the source of the airflow in direct relationship to the relative expected usage of the data. Thus, data having a higher expected usage is stored in a device closer to the airflow source relative to other data having a lower expected usage and data having a lower expected usage is stored in a device farther from the airflow source relative to other data having a higher expected usage. Additionally, data may be dynamically relocated based upon actual usage.

20 Claims, 4 Drawing Sheets

DATA LOCATION MANAGEMENT IN HIGH DENSITY PACKAGING

TECHNICAL FIELD

The present invention relates to disk storage in general and to managing the location of data on hard disk drives in high density drive enclosures.

BACKGROUND ART

Hard disk drives (HDDs) require a certain amount of cooling for efficient and reliable operation over a long life. When a single drive is installed in a drive enclosure (FIG. 1), heat which is generated may be dissipated through convection or mechanically with a cooling fan. The industry has been moving towards disk drive modules (DDMs) with a smaller form factor which require less volume than their predecessors. Thus, high density packaging of multiple smaller drives within a single enclosure or service boundary is a more efficient use of space than standard rack mounted drives. In FIG. 2, sixteen DDMs, each holding, for example, a 3.5 inch drive, are installed one-deep in a single enclosure. A cooling fan or blower directs air through the enclosure from front to back (or back to front) in the direction of the arrow. Thus, each DDM is the same distance from the fan as each other DDM and each, therefore, receives the same cooling effect from the airflow.

As drive density continues to increase, small form factor 2.5 inch drives are being used. However, one-deep packaging of 2.5 inch drives is not an efficient use of volume and multi-drive trays (MDTs) have been developed in which two or more small HDDs are installed from front to back in an enclosure. The same cooling airflow remains in use with such MDTs. Therefore, the first HDD in the airflow (that is, the HDD closest to the source of the airflow) will be exposed to the coolest air and will heat the air as it flows past. The last HDD in the airflow (that is, the HDD farthest from the airflow source) will be exposed to the warmest air. Because HDD reliability is related to the operating temperature, those drives farthest from the airflow source will tend to have the lowest reliability and/or shortest life.

Consequently, there remains a desire to reduce the uneven effects of a cooling airflow on HDDs in an MDT.

SUMMARY OF THE INVENTION

In the present invention, a high density storage enclosure includes a plurality of storage devices, such as hard disk drives, positioned within a cooling airflow. Data to be stored to a storage device is received and a determination is made as to the expected usage of the data relative to other data stored on devices within the enclosure. The data is stored in a device having a position within the airflow relative to the source of the airflow in direct relationship to the relative expected usage of the data. Thus, data having a higher expected usage is stored in a device closer to the airflow source relative to other data having a lower expected usage and data having a lower expected usage is stored in a device farther from the airflow source relative to other data having a higher expected usage. Additionally, data may be dynamically relocated based upon actual usage.

DETAILED DESCRIPTION OF THE PREFERRED EMBODIMENT

Figure 1:
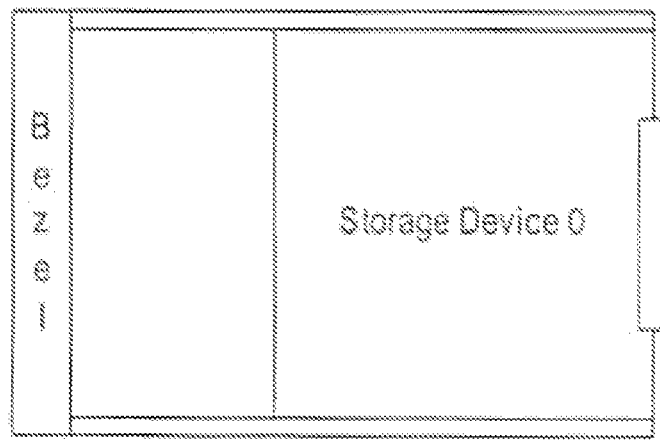
FIG. 1 illustrates a prior art enclosure with a single HDD.
Figure 2:
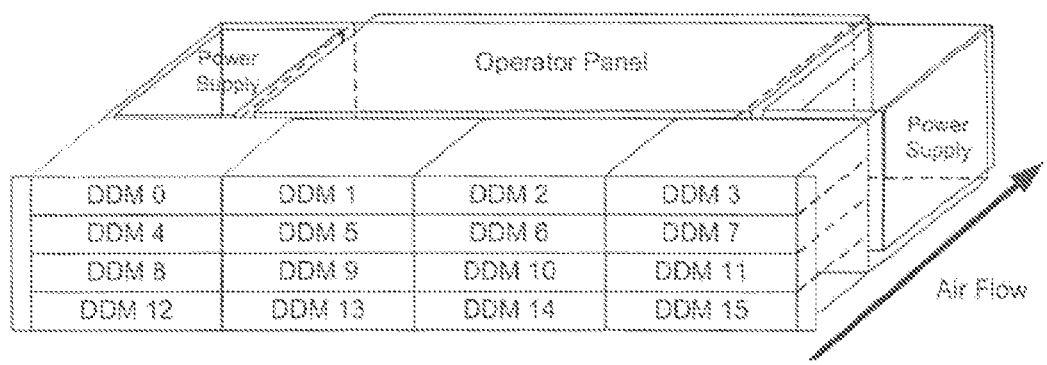
FIG. 2 illustrates a prior art multi-drive enclosure in which multiple HDDs are installed one-deep across the cooling airflow.
Figure 3:
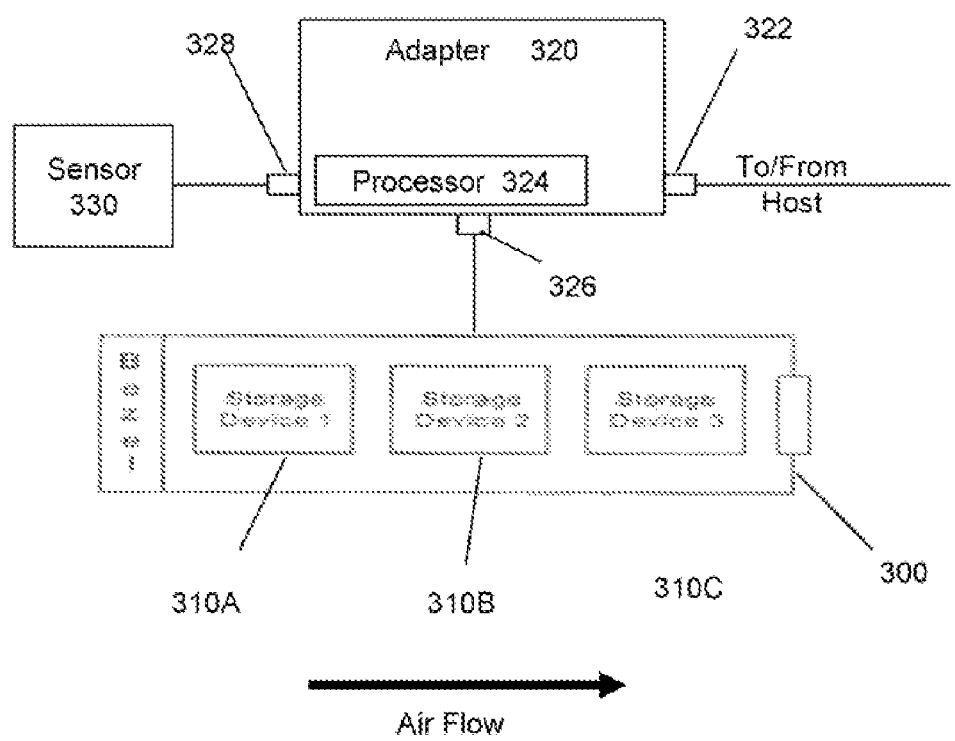
FIG. 3 illustrates a multi-drive enclosure in which multiple HDDs are installed parallel to the cooling airflow and with which the present invention may be implemented.
Figure 4:
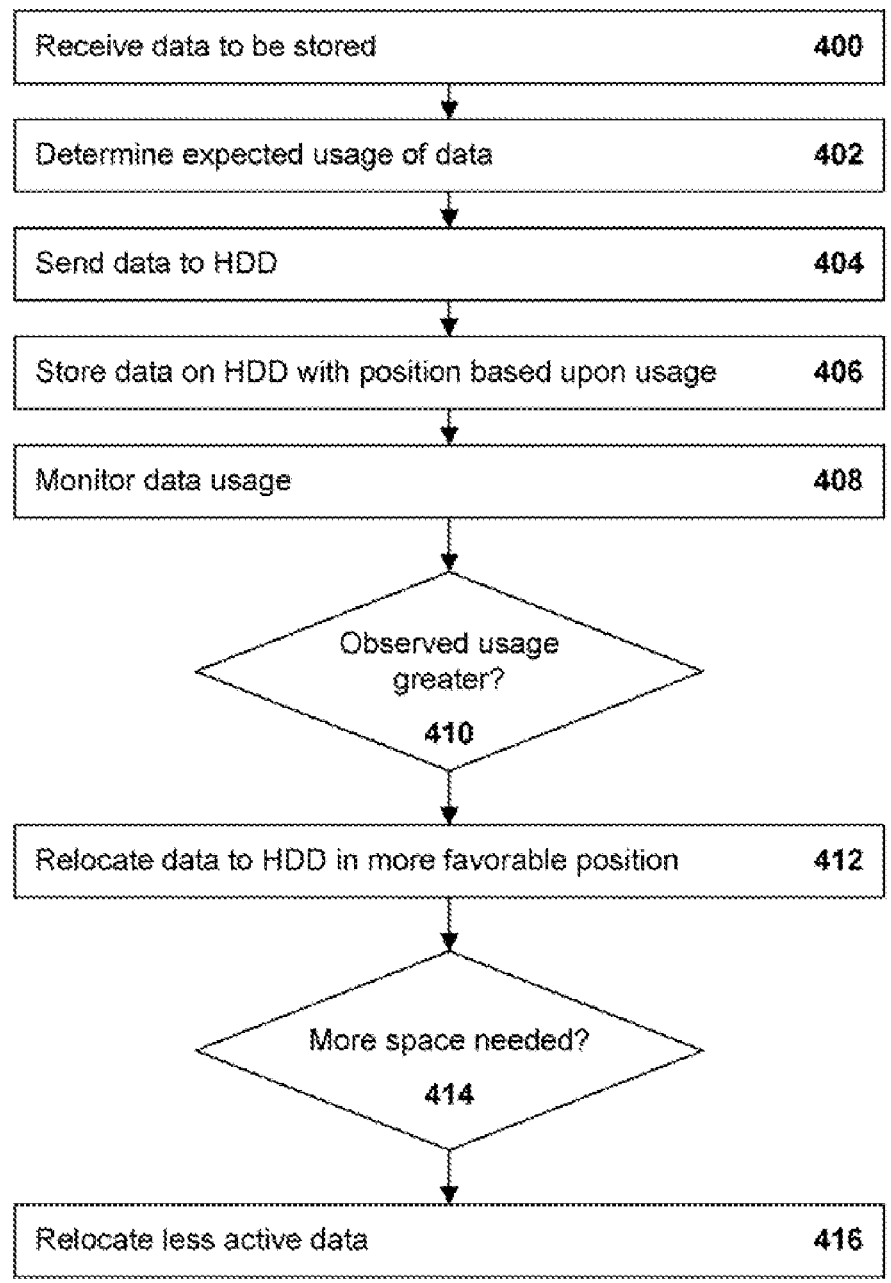
FIG. 4 is a flowchart of a method of the present invention.

FIG. 3 illustrates a multi-drive enclosure 300 in which multiple HDDs 310A, 310B, 310C are installed in series with the cooling airflow. The HDD closest to the source of the airflow, HDD 310A, is exposed to the coolest air which is heated as it flows past the HDD. The HDD farthest from the airflow source, HDD 310C, is exposed to the warmest air and will therefore tend to be the least reliable drive in the enclosure 300. Referring also to the flowchart of FIG. 4, data to be stored is received from a host (not shown) (step 400) by an array controller or adapter 320 through a host adapter interface or 322. A processor 324 is programmed or configured to determine the expected usage of the data relative to other data stored on HDDs 310A, 310B, 310C in the enclosure 300 (step 402). The processor is further programmed to direct that the received data be sent to an HDD 310A, 310B or 310C through a device interface or adapter 326 (step 404). The processor 324 selects an HDD on which to store the received data based upon the expected usage of the data (step 408). The received data will be stored on an HDD having a position within the airflow relative to the airflow source which has a direct relationship to the expected usage of the received data relative to other stored data. Thus, data which is expected to have a higher usage will be stored on an HDD which is closer to the airflow source than stored data having a lower usage. Conversely, data which is expected to have a lower usage will be stored on an HDD which is farther from the airflow source than stored data having a higher usage. Consequently, HDDs which have the highest workload or activity and generate the most heat will be in the most environmentally friendly positions, thereby increasing reliability and reducing potential failures.

In addition to directing that received data be stored on a drive based upon its expected usage, data which is already stored may optionally be dynamically transferred from one HDD to another as actual usage changes. The processor 324 may monitor data and drive usage (step 410). If the actual, observed workload becomes greater for data that was stored on an HDD in a less environmentally favorable position (step 412), the data may be moved to an HDD in a more environmentally favorable position (step 414). If space is needed on an HDD in a more environmentally favorable position, data which is less active may be moved to an HDD in a less environmentally favorable position (step 416). Moreover, data may be moved in an anticipatory manner if the data is expected to undergo a period of high activity, such as a batch job. The data may be moved back to its original location upon completion of the period of high activity. If data continuously undergoes high activity, it may be left on an HDD in a more environmentally favorable position. Similarly, data which is relatively inactive, such as point-in-time targets for backups, may be left on an HDD in a less environmentally favorable position.

A system administrator or other user may also input a description of an expected workload pattern for specified data, the data may then be stored or moved in response to such input.

Additionally, the array adapter 320 may receive a parameter value input, though an appropriate adapter or interface 328, from a sensor 330 which is sensitive to an environmental condition, such as ambient temperature or humidity. In some conditions, the cooling of storage devices is maintained based on inlet temperature; relocation of data may not be a concern. However, as conditions change, such as if the temperature increases, relocation of data in accordance with the present invention may be beneficial to maintain device reliability. Thus, the processor may be programmed or configured to respond to one or more environmental parameters and initiate data location or relocation in accordance with the present invention.

Figure 5:
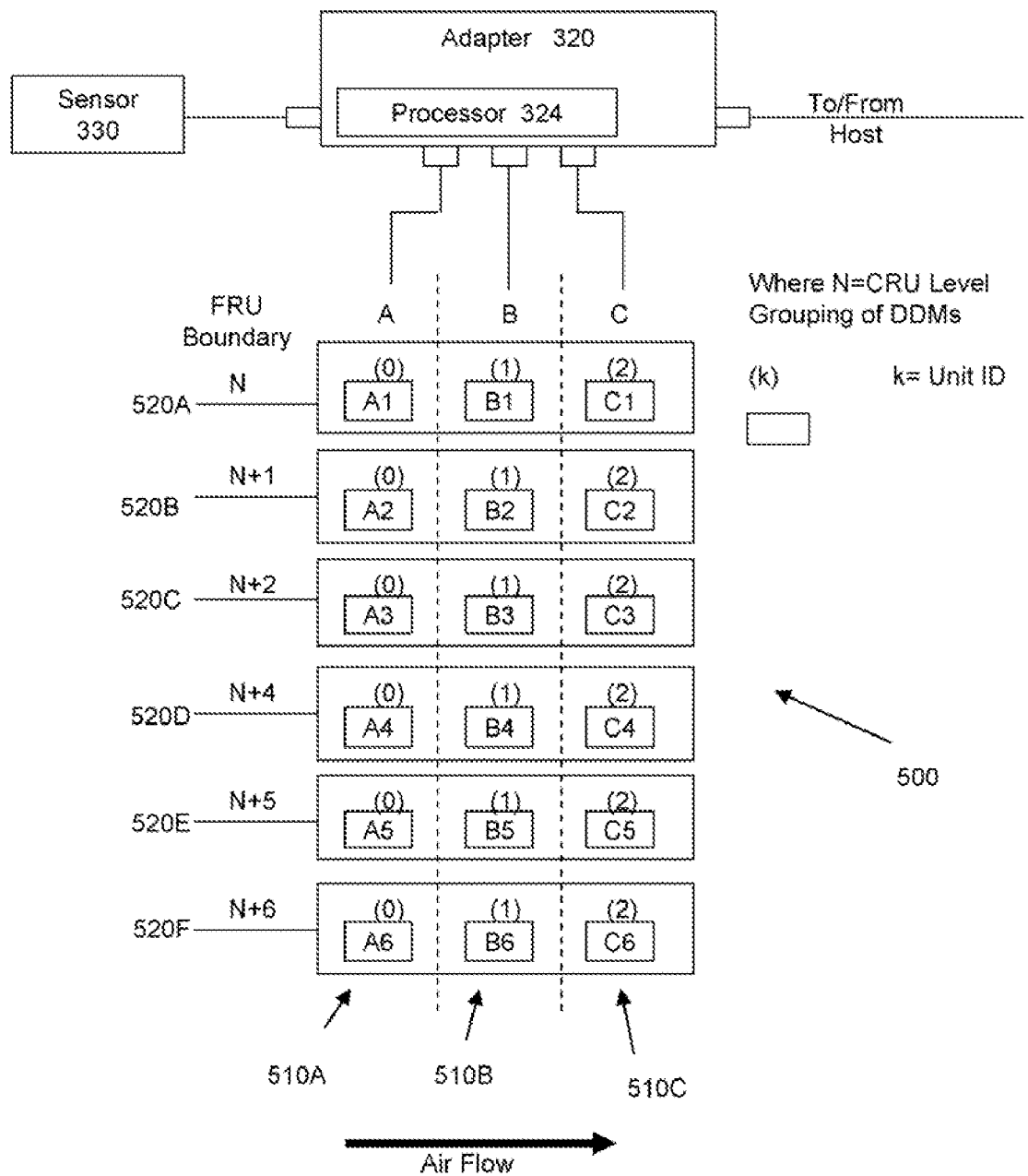
FIG. 5 illustrates a storage system with multiple RAID arrays with which the present invention may be implemented.

The present invention may also be implemented in a system 500 of multiple disk arrays, as illustrated in FIG. 5. The system 500 includes six multi-drive trays (MDTs) or field-replaceable units (FRUs) 520A-520F configured into three RAID arrays 510A, 510B, 510C, although the present invention may be implemented with a different number of RAID arrays. In FIG. 5, array A is closest to the source of the airflow while array C is farthest. Logical data volumes may be located and relocated within the system 500 in the same manner as described with respect to FIG. 3. Thus, volumes under the heaviest workload may be located or relocated to the drives of array 510A while volumes under lighter workloads may be located or relocated to the drives of array 510C.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The described embodiments were chosen and described in order to best explain the principles of the invention, the practical application, and to enable others of ordinary skill in the art to understand the invention for various embodiments with various modifications as are suited to the particular use contemplated. For example, the present invention may be implemented with storage devices other than hard disk drives. Moreover, although described above with respect to methods and systems, the need in the art may also be met with a computer program product containing instructions for managing the location of data in a high density disk drive enclosure or a method for deploying computing infrastructure comprising integrating computer readable code into a computing system for managing the location of data in a high density disk drive enclosure.

What is claimed is:

1. A disk array adapter, comprising:
   a plurality of device adapters for interconnecting with a like plurality of hard disk drives positioned in an enclosure within a cooling airflow from an airflow source;
   a host adapter through which data is received to be stored on a hard disk drive;
   a processor configured to:
   determine the expected usage of the received data relative to other data stored on disk drives in the enclosure; and
   direct that the received data be stored in a disk drive having a position within the airflow relative to the source of the airflow in direct relationship to the relative expected usage of the received data, whereby data having a higher expected usage is stored in a disk drive closer to the airflow source relative to other data having a lower expected usage and data having a lower expected usage is stored in a disk drive farther from the airflow source relative to other data having a higher expected usage.

2. The disk array adapter of claim 1, the processor further configured to:
   following a period of high usage and before a period of low usage, direct that the stored data be moved from a disk drive having a position close to the airflow source to a disk drive having a position farther from the source of the airflow source; and
   following a period of low usage and before a period of high usage, direct that the stored data be moved from a disk drive having a position farther from the airflow source to a disk drive having a position closer to the source of the airflow source.

3. The disk array adapter of claim 2, further comprising:
   an interface coupled to an environmental sensor; and
   the processor further configured to:
   receive an environmental parameter from the sensor; and
   initiate a move of the stored data if a value of the environmental parameter exceeds a predefined value.

4. The disk array adapter of claim 3, wherein the environmental parameter comprises at least one of ambient temperature and humidity.

5. The disk array adapter of claim 1, wherein:
   the disk drives are configured as a plurality of RAID arrays, including a first array positioned closer to the airflow source than a second array; and
   in response to the determination of expected usage, the received data comprises a logical volume to be stored in a selected one of the plurality of RAID arrays.

6. A method for managing the location of data in a high density disk drive enclosure, comprising:
   receiving data to be stored to a disk drive in a high density drive enclosure having a plurality of disk drives positioned within a cooling airflow from an airflow source;
   determining the expected usage of the received data relative to other data stored on disk drives in the enclosure; and
   directing that the received data be stored in a disk drive having a position within the airflow relative to the source of the airflow in direct relationship to the relative expected usage of the received data, whereby data having a higher expected usage is stored in a disk drive closer to the airflow source relative to other data having a lower expected usage and data having a lower expected usage is stored in a disk drive farther from the airflow source relative to other data having a higher expected usage.

7. The method of claim 6, further comprising:
   following a period of high usage and before a period of low usage, directing that the stored data be moved from a disk drive having a position close to the airflow source to a disk drive having a position farther from the source of the airflow source; and
   following a period of low usage and before a period of high usage, directing that the stored data be moved from a disk drive having a position farther from the airflow source to a disk drive having a position closer to the source of the airflow source.

8. The method of claim 7, further comprising:
receiving an environmental parameter for the enclosure; and
initiating a move of the stored data if a value of the environmental parameter exceeds a predefined value.

9. The method of claim 8, wherein the environmental parameter comprises at least one of ambient temperature and humidity.

10. The method of claim 6, wherein:
the disk drives are configured as a plurality of RAID arrays, including a first array positioned closer to the airflow source than a second array; and
in response to the determination of expected usage, the received data comprises a logical volume to be stored in a selected one of the plurality of RAID arrays.

11. The method of claim 6, wherein determining the expected usage comprises a user determination of a workload pattern for the received data.

12. A computer program product of a computer readable storage medium usable with a programmable computer, the computer program product having computer-readable storage code embodied therein for managing the location of data in a high density disk drive enclosure, the computer-readable storage code comprising instructions for:
receiving data to be stored to a disk drive in a high density drive enclosure having a plurality of disk drives positioned within a cooling airflow from an airflow source;
determining the expected usage of the received data relative to other data stored on disk drives in the enclosure; and
directing that the received data be stored in a disk drive having a position within the airflow relative to the source of the airflow in direct relationship to the relative expected usage of the received data, whereby data having a higher expected usage is stored in a disk drive closer to the airflow source relative to other data having a lower expected usage and data having a lower expected usage is stored in a disk drive farther from the airflow source relative to other data having a higher expected usage.

13. The computer program product of claim 12, the computer-readable code further comprising instructions for:
following a period of high usage and before a period of low usage, directing that the stored data be moved from a disk drive having a position close to the airflow source to a disk drive having a position farther from the source of the airflow source; and
following a period of low usage and before a period of high usage, directing that the stored data be moved from a disk drive having a position farther from the airflow source to a disk drive having a position closer to the source of the airflow source.

14. The computer program product of claim 13, the computer-readable code further comprising instructions for:
receiving an environmental parameter for the enclosure; and
initiating a move of the stored data if a value of the environmental parameter exceeds a predefined value.

15. The computer program product of claim 14, wherein the environmental parameter comprises at least one of ambient temperature and humidity.

16. The computer program product of claim 12, wherein:
the disk drives are configured as a plurality of RAID arrays, including a first array positioned closer to the airflow source than a second array; and
in response to the determination of expected usage, the received data comprises a logical volume to be stored in a selected one of the plurality of RAID arrays.

17. A method for deploying computing infrastructure, comprising integrating computer readable code into a computing system, wherein the code, for managing the location of data in a high density disk drive enclosure, in combination with the computing system, is capable of performing the following:
receiving data to be stored to a disk drive in a high density drive enclosure having a plurality of disk drives positioned within a cooling airflow from an airflow source;
determining the expected usage of the received data relative to other data stored on disk drives in the enclosure; and
directing that the received data be stored in a disk drive having a position within the airflow relative to the source of the airflow in direct relationship to the relative expected usage of the received data, whereby data having a higher expected usage is stored in a disk drive closer to the airflow source relative to other data having a lower expected usage and data having a lower expected usage is stored in a disk drive farther from the airflow source relative to other data having a higher expected usage.

18. The method of claim 17, further comprising:
following a period of high usage and before a period of low usage, directing that the stored data be moved from a disk drive having a position close to the airflow source to a disk drive having a position farther from the source of the airflow source; and
following a period of low usage and before a period of high usage, directing that the stored data be moved from a disk drive having a position farther from the airflow source to a disk drive having a position closer to the source of the airflow source.

19. The method of claim 18, further comprising:
receiving an environmental parameter for the enclosure; and
initiating a move of the stored data if a value of the environmental parameter exceeds a predefined value.

20. The method of claim 17, wherein:
the disk drives are configured as a plurality of RAID arrays, including a first array positioned closer to the airflow source than a second array; and
in response to the determination of expected usage, the received data comprises a logical volume to be stored in a selected one of the plurality of RAID arrays.

* * * * *